(12) United States Patent
Yang

(10) Patent No.: US 8,082,488 B2
(45) Date of Patent: Dec. 20, 2011

(54) METHOD FOR ACCESSING A PARENT PAGE WHILE BROWSING WEB PAGES

(75) Inventor: Yanming Yang, Beijing (CN)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/305,055

(22) PCT Filed: Mar. 19, 2007

(86) PCT No.: PCT/CN2007/000872
§ 371 (c)(1),
(2), (4) Date: Aug. 10, 2009

(87) PCT Pub. No.: WO2007/107100
PCT Pub. Date: Sep. 27, 2007

(65) Prior Publication Data
US 2010/0017729 A1    Jan. 21, 2010

(51) Int. Cl.
*G06F 17/00* (2006.01)
(52) U.S. Cl. .................................................... 715/208
(58) Field of Classification Search .................. 715/205, 715/206, 208, 234
See application file for complete search history.

(56) References Cited

U.S. PATENT DOCUMENTS

| | | | | |
|---|---|---|---|---|
| 5,987,480 A * | 11/1999 | Donohue et al. | | 715/207 |
| 6,003,046 A * | 12/1999 | Nielsen | | 715/206 |
| 6,177,936 B1 | 1/2001 | Cragun | | |
| 6,594,692 B1 * | 7/2003 | Reisman | | 709/219 |
| 7,127,501 B1 * | 10/2006 | Beir et al. | | 709/219 |
| 7,475,346 B1 * | 1/2009 | Bullock et al. | | 709/203 |
| 7,885,981 B2 * | 2/2011 | Kaufman et al. | | 707/802 |
| 2002/0194611 A1 * | 12/2002 | Hodgkinson | | 725/109 |
| 2005/0065970 A1 * | 3/2005 | King et al. | | 707/102 |
| 2005/0204047 A1 * | 9/2005 | Mitchell et al. | | 709/228 |
| 2006/0117262 A1 * | 6/2006 | Nagayama | | 715/734 |
| 2006/0212792 A1 * | 9/2006 | White et al. | | 715/511 |

FOREIGN PATENT DOCUMENTS

CN    1582442    2/2005

OTHER PUBLICATIONS

Buyukkokten, Orkut, et al, "Power Browser: Efficient Web Browsing for PDAs", CHI '00: Proceedings of the SIGCHI Conference on Human Factors in Computing Systems, ACM, ISBN: 1-58113-216-6, pp. 430-437.*
International Search Report dated Jun. 18, 2007.

* cited by examiner

*Primary Examiner* — Laurie Ries
(74) *Attorney, Agent, or Firm* — RatnerPrestia

(57) ABSTRACT

According to the present invention, a method for accessing a parent page while browsing web pages is provided, which comprises steps of: receiving by a server a request from a user to extract a web page; when extracting the web page, updating by the server an "UP" list according to a parent-children-relation markup pre-stored in a page link to the web page, and entering into the web page linked by the page link; when requesting by the user the parent page, obtaining by the server the current "UP" list for the user to extract the parent page.

5 Claims, 3 Drawing Sheets

METHOD FOR ACCESSING A PARENT PAGE WHILE BROWSING WEB PAGES

BACKGROUND OF THE INVENTION

1. Field of Invention

The present invention relates to a method for accessing a parent page while browsing web pages, which can dynamically update a list of parent pages for a user browsing path by using a parent-children-relation markup pre-stored in a web page link, so as to easily and correctly return to the parent page.

2. Description of Prior Art

When a user browses a website, "forward"/"backward" are always used to return to previously accessed web pages, or "up" is used to return to its parent page. Moreover, the user may access one and the same page through different access paths, and thus in order to return to the correct parent page, the link for "up" in the currently accessed page must be dynamically determined. Therefore, there is a need for a method meeting the above requirements. Additionally, the present invention provides a general-purpose "up" operation capability for a browser so as to make the "up" operation of the browser meet the actual requirement of the user well.

At present, the user may "forward" or "backward" to the previously accessed web pages according to URL (Unified Resource Locator) history access information stored in the browser. However, the browsing relationship for "up", i.e., the relationship between a parent page and a children page, is determined by an HTML (Hypertext Markup Language) webpage designer, so the browser can not perform an "UP" browsing operation. The current "UP" operation of the browser is based on hierarchical analyses for the URL, which can not truly meet the user's actual requirements.

Further, the "UP" links directing to the parent pages in some web pages on a certain website are static links. Thus, the relationship between the children page and the parent page are fixed. Therefore, it is impossible to return to different parent pages from one and the same page according to different browsing paths of the user.

SUMMARY OF THE INVENTION

The present invention relates to a method for accessing a parent page while browsing web pages, which can dynamically update a list of parent pages for a user browsing path by using a parent-children-relation markup pre-stored in a web page link, so as to easily and correctly return to the parent page. Furthermore, according to the present invention, it is possible to return to different parent pages from one and the same page according to different browsing paths of the user.

According to the present invention, a method for accessing a parent page while browsing web pages is provided, which comprises steps of: receiving by a server a request from a user to extract a web page; when extracting the web page, updating by the server an "UP" list according to a parent-children-relation markup pre-stored in a page link to the web page, and entering into the web page linked by the page link; when requesting by the user the parent page, obtaining by the server the current "UP" list for the user to extract the parent page.

Preferably, the step of updating by the server the "UP" list according to a parent-children-relation markup pre-stored in a page link to the web page includes: when the parent-children-relation markup represents that a current page and a target page are respectively the parent page and the children page, adding the current page which is the parent page into the "UP" list; when the parent-children-relation markup represents that a current page and a target page are brother pages, maintaining the current "UP" list as it is; and when the parent-children-relation markup represents that a current page and a target page are respectively the children page and the parent page, directing to the last item in the current "UP" list which is to be the target page, and deleting the target page which is the parent page from the current "UP" list.

Preferably, the step of obtaining by the server the current "UP" list for the user to extract the parent page includes: obtaining by the server the current "UP" list for the user, and extracting the parent page according to the last item in the current "UP" list which is to be the target page.

Preferably, the step of requesting by the user the parent page includes: requesting by the user the parent page through pressing an "UP" button in the current page.

Preferably, the UP list is used to store a list of parent pages for a current browsing path of the user.

BRIEF DESCRIPTION OF THE DRAWINGS

The above objects, advantages and features of the present invention will be apparent from the following detailed description on the preferred embodiments taken conjunction with the drawings in which.

DETAILED DESCRIPTION OF PREFERRED EMBODIMENTS

Figure 1:
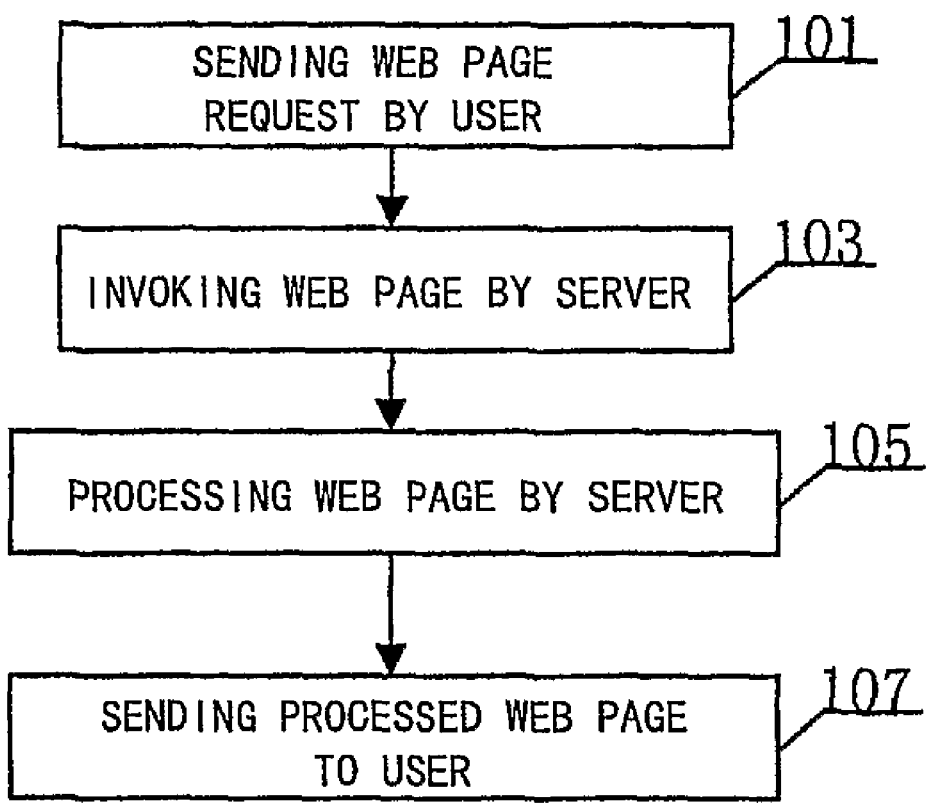
FIG. 1 is a general flowchart for invoking and processing, by a server, web pages according to a user's request in the embodiment of the present invention.

Now, preferred embodiments of the present invention will be described by referring to the drawings.

FIG. 1 is a general flowchart for invoking and processing, by a server, web pages according to a user's request in the embodiment of the present invention.

Generally, the web pages are stored in the server as files so that the user may request to access. As shown in FIG. 1, firstly, at step 101, the user sends a web page request; after receiving the request, at step 103, the server (a Web server) finds a corresponding web page in its memory according to the user's request parameters and invokes it in, and then at step 105, the server processes the web page; and finally, at step 107, the server returns the processed result to the user.

In the present invention, when designing the web pages, the HTML designer will represent browsing relationship (parent-children-relation) among the pages with a corresponding parent-children-relation markup, and pre-store the parent-children-relation markup into a page link.

In each hypertext link for the page, when a target page is its children page, then a markup of UPLIST(+) is added into the link, to indicate that when the page is generated, the current page will be necessarily added into an "UP" list (UPLIST); when the target page is its parent page, then markups of UP_TARGET and UPLIST(−) are added, to indicate that when the page is generated, the target page of the hyperlink is the last page in the "UP" list and the last element is deleted from the "UP" list; and when the target page is its brother page, then a markup of UPLIST(.) is added, to indicate that when the page is generated, only content of the "UP" list in the current HTTP parameters is necessarily put into the link, that is, the current UPLIST is maintained.

Figure 2:
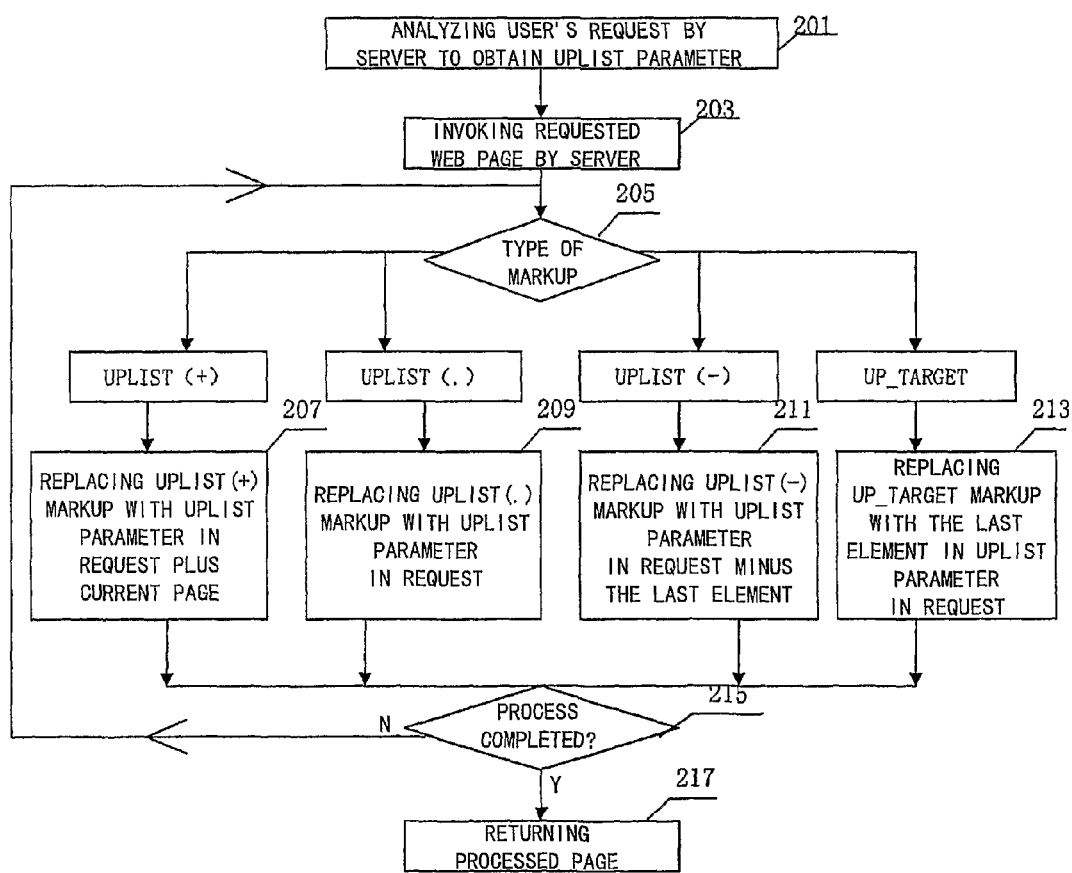
FIG. 2 is a detailed flowchart for processing, by the server, the web page while invoking the requested web page in the embodiment of the present invention.

FIG. 2 is a flowchart for processing, by the server, the web page in the embodiment of the present invention. As shown in FIG. 2, at step 201, the server receives and analyzes the user's request to obtain the current "UP" list; at step 203, the server invokes the requested web page according to the user's request; and then, at step 205, the server updates the "UP" list according to the parent-children-relation markup pre-stored in the page link to the page.

In particularly, when said parent-children-relation markup is UPLIST(+), i.e., when said parent-children-relation markup represents that the current page and the target page are respectively the parent page and the children page, at step 207, the current page which is the parent page is added into the "UP" list. When said parent-children-relation markup is UPLIST(.), i.e., when said parent-children-relation markup represents that the current page and the target page are brother pages, at step 209, the current "UP" list is maintain as it is. When said parent-children-relation markups are UPLIST(-) and UP_TARGET, i.e., when said parent-children-relation markups represent that the current page and the target page are respectively the children page and the parent page, at step 213, the last item in the current "UP" list which is to be the target page is directed to (by UP_TARGET); and ate step 211, the target page which is the parent page is deleted from the current "UP" list.

Then, at step 215, it is judged whether the process is completed or not. When it is determined that the process is completed (step 215: YES), at step 217, the processed page is returned.

Thereafter, when the user requests the parent page through pressing, for example, an UP button, the server may obtain the current "UP" list for the user, and extract the parent page, i.e., the target parent page, according to the last item in the current "UP" list directed by the UP_TARGET.

As described above, in the present invention, the "UP" list is used for storing the list of parent pages for the current browsing path of the user. That is to say, in the present invention, it is possible to return to different parent pages from one and the same page according to different browsing paths of the user.

Additionally, according to the present invention, it is possible to dynamically update the list of parent pages for the user's browsing path by using the parent-children-relation markup pre-stored in the web page link.

Figure 3:
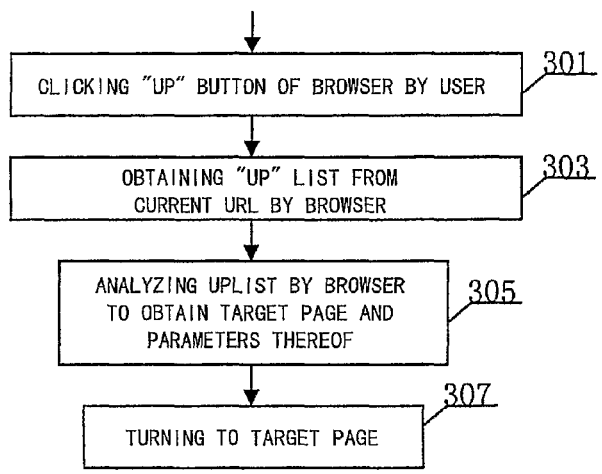
FIG. 3 is a flowchart for an "UP" operation procedure of a browser in the embodiment of the present invention.

FIG. 3 is a flowchart for an "UP" operation procedure of a browser in the embodiment of the present invention.

As shown in FIG. 3, at step 301, the user clicks the "UP" button of the browser; at step 303, the browser obtains the "UP" list from the current URL; and then, at step 305, the browser analyzes the "UP" list to obtain the target page and the parameters thereof; and finally, at step 307, the browser turns to a corresponding target service according to the obtained target page and information on the parameters thereof.

Figure 4:
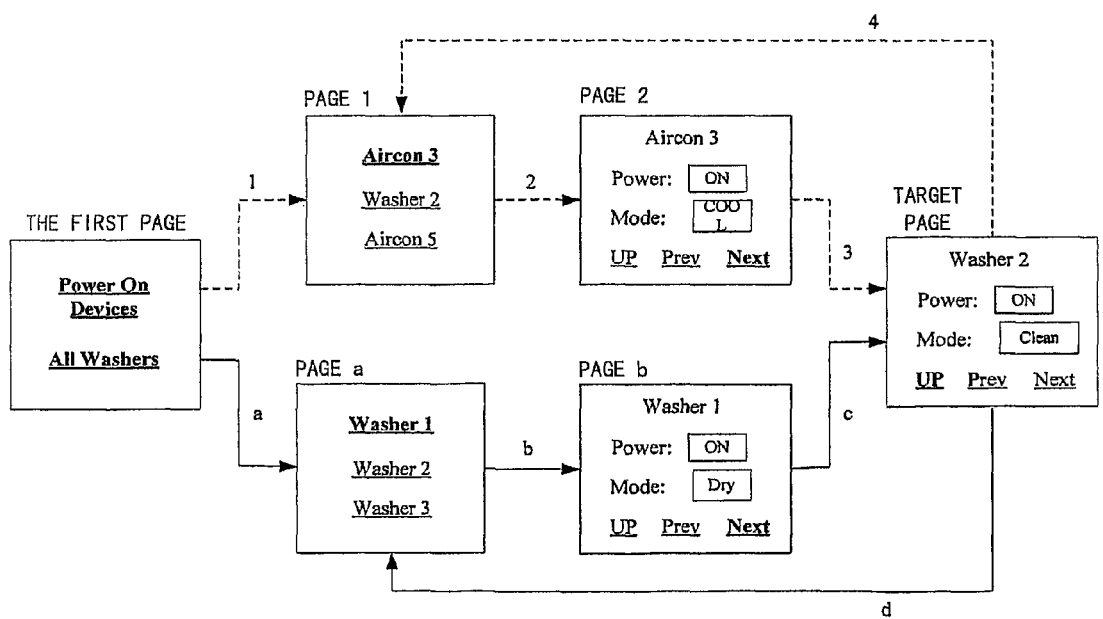
FIG. 4 is an implementation example for illustrating the method of the present invention.

FIG. 4 is an implementation example for illustrating the method of the present invention. As shown in FIG. 4, the user may arrive at the target page through two paths (a dotted line path and a solid line path). When locating at the target page, the user may click the UP link in the page or the UP button of the browser so as to return to the correct parent page. For the browsing path indicated in dotted line, it returns to PAGE 1, and for the browsing path in solid line, it returns to PAGE a.

The configurations of the corresponding "UP" lists in the respective pages are as follows.
Configurations of the First Page:
"Power On Devices" link
<A href="page1.html?UPLIST(+)">Power On Devices </A>
"All Washers" link
<A href="pagea.html?UPLIST(+)">All Washers </A>
Configurations of PAGE 1:
"Aricon 3" link
<A href="page2.html?UPLIST(+)">Aircons 3</A>
Configurations of PAGE 2:
"Next" link
<A href="TargetPage.html?UPLIST(.)">Next </A>
Configurations of PAGE a:
"Washer 1" link
<A href="pageb.html?UPLIST(+)">Washer 1</A>
Configurations of PAGE b:
"Next" link:
<A href="TargetPage.html?UPLIST(.)">Next </A>
Configurations of the Target Page:
"UP" link:
<A href="UP_TARGET.html?UPLIST(-)">UP</A>

As configured above, according to the method of the present invention, after the web pages are processed by the server, the used URL address while requesting the target page is:
for the browsing path indicated in dotted line:
Http://ServerAddr/TargetPage.html?uplist=(fristPage; page1)
for the browsing path indicated in solid line:
Http://ServerAddr/TargetPage.html?uplist=(fristPage;pagea)

Thus, when the user clicks the "UP" link in the target page or clicks the "UP" button of the browser, the corresponding parent page thereof (PAGE 1 or PAGE a) may be obtained from the "UP" list parameter of the current URL, thereby returning to the correct parent page.

Although the present invention is illustrated with reference to the preferred embodiments thereof, it can be understood by those skilled in the art that various changes, substitutions and alters to the present invention are possible without departing from the spirit and scope of the present invention. Therefore, the present invention is not limited to the above embodiments but only limited by the following claims and the equivalents thereof.

What is claimed is:

1. A method for accessing a parent page while browsing web pages, comprising steps of:
   receiving by a server a request from a user to extract a web page;
   when extracting the web page, updating by the server an "UP" list according to a parent-children-relation markup pre-stored in a page link to the web page, and entering into the web page linked by the page link; and
   when requesting by the user the parent page, obtaining by the server the current "UP" list for the user to extract the parent page.

2. The method according to claim 1, wherein the step of updating by the server the "UP" list according to a parent-children-relation markup pre-stored in a page link to the web page includes:
   when the parent-children-relation markup represents that a current page and a target page are respectively the parent page and the children page, adding the current page which is the parent page into the "UP" list;

when the parent-children-relation markup represents that a current page and a target page are brother pages, maintaining the current "UP" list as it is; and when the parent-children-relation markup represents that a current page and a target page are respectively the children page and the parent page, directing to the last item in the current "UP" list which is to be the target page, and deleting the target page which is the parent page from the current "UP" list.

3. The method according to claim 2, wherein the step of obtaining by the server the current "UP" list for the user to extract the parent page includes: obtaining by the server the current "UP" list for the user, and extracting the parent page according to the last item in the current "UP" list which is to be the target page.

4. The method according to claim 1, wherein the step of requesting by the user the parent page includes: requesting by the user the parent page through pressing an "UP" button in the current page.

5. The method according to claim 1, wherein the UP list is used to store a list of parent pages for a current browsing path of the user.

* * * * *